(12) United States Patent
Goldszmidt et al.

(10) Patent No.: US 8,504,874 B2
(45) Date of Patent: Aug. 6, 2013

(54) REPAIR-POLICY REFINEMENT IN DISTRIBUTED SYSTEMS

(75) Inventors: Moises Goldszmidt, Palo Alto, CA (US); Mihai Budiu, Sunnyvale, CA (US); Yue Zhang, Sunnyvale, CA (US); Michael Pechuk, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 422 days.

(21) Appl. No.: 12/886,566

(22) Filed: Sep. 21, 2010

(65) Prior Publication Data

US 2012/0072769 A1 Mar. 22, 2012

(51) Int. Cl.
*G06F 11/00* (2006.01)

(52) U.S. Cl.
USPC .......................................................... 714/25

(58) Field of Classification Search
USPC ................ 714/2, 25, 26, 30, 33, 37, 39, 47.1
See application file for complete search history.

(56) References Cited

U.S. PATENT DOCUMENTS

| | | | |
|---|---|---|---|
| 6,795,935 B1* | 9/2004 | Unkle et al. | 714/37 |
| 6,988,011 B2* | 1/2006 | Varma et al. | 714/37 |
| 7,373,552 B2 | 5/2008 | Bjorsne | |
| 7,578,079 B2 | 8/2009 | Furem | |
| 7,668,944 B2 | 2/2010 | Leib et al. | |
| 7,694,188 B2 | 4/2010 | Raghuraman et al. | |
| 2003/0005107 A1 | 1/2003 | Dulberg et al. | |
| 2005/0210329 A1* | 9/2005 | Goss et al. | 714/25 |
| 2006/0206544 A1 | 9/2006 | Oks et al. | |
| 2007/0101193 A1* | 5/2007 | Johnson et al. | 714/25 |
| 2011/0173496 A1* | 7/2011 | Hosek et al. | 714/26 |

OTHER PUBLICATIONS

Bodik, et al., "Fingerprinting the Datacenter: Automated Classification of Performance Crises", Retrieved at << http://research.microsoft.com/pubs/102399/hiLighter.pdf >>, Proceedings of the 5th European conference on Computer systems, Apr. 13-16, 2010, p. 1-14.

Burgess, et al., "Autonomic Computing Approximated by Fixed-Point Promises", Retrieved at << http://citeseerx.ist.psu.edu/viewdoc/download?doi=10.1.1.65.2455&rep=rep1&type=pdf >>, Proceedings of First IEEE International Workshop on Modeling Autonomic Communication Environments, 2006, pp. 26.

(Continued)

*Primary Examiner* — Joseph D Manoskey
(74) *Attorney, Agent, or Firm* — Microsoft Corporation (57) ABSTRACT

In a distributed system a plurality of devices (including computing units, storage and communication units) are monitored by an automated repair service that uses sensors and performs one or more repair actions on computing devices that are found to fail according to repair policies. The repair actions include automated repair actions and non-automated repair actions. The health of the computing devices is recorded in the form of states along with the repair actions that were performed on the computing devices and the times at which the repair actions were performed, and events generated by both sensors and the devices themselves. After some period of the time, the history of states of each device, the events, and the repair actions performed on the computing devices are analyzed to determine the effectiveness of the repair actions. A statistical analysis is performed based on the cost of each repair action and the determined effectiveness of each repair action, and one or more of the policies may be adjusted, as well as determining from the signals and events from the sensors whether the sensors themselves require adjustment.

20 Claims, 5 Drawing Sheets

OTHER PUBLICATIONS

Cohen, et al., "Correlating Instrumentation Data to System States: A Building Block for Automated Diagnosis and Control", Retrieved at << http://reference.kfupm.edu.sa/content/c/o/correlating_instrumentation_data_to_syst_3460356.pdf >>, Proceedings of the 6th conference on Symposium on Opearting Systems Design & Implementation, vol. 6, Dec. 6-8, 2004, p. 231-244.

Barroso, et al., "The Datacenter as a Computer—An Introduction to the Design of Warehouse-Scale Machines", Retrieved at << http://www.morganclaypool.com/doi/pdf/10.2200/S00193ED1V01Y200905CAC006 >>, Synthesis Lectures on Computer Architecture No. 6, 2009, pp. 120.

Bodik, et al., "HiLighter: Automatically Building Robust Signatures of Performance Behavior for Small- and Large-Scale Systems", Retrieved at << http://research.microsoft.com/pubs/74536/sysml08.pdf >>, Proceedings of the Third conference on Tackling computer systems problems with machine learning techniques, 2008, p. 1-6.

Candea, et al., "Improving Availability with Recursive Microreboots: A Soft-State System Case Study", Retrieved at << http://citeseerx.ist.psu.edu/viewdoc/download?doi=10.1.1.94.8379&rep=rep1&type=pdf >>, Dependable systems and networks-performance and dependability symposium, vol. 56, Issue 1-4, Mar. 2004, p. 1-26.

Cretu-Ciocârlie, et al., "Hunting for Problems with Artemis", Retrieved at << http://www.usenix.org/event/wasl08/tech/full_papers/cretu/cretu.pdf >>, pp. 8, Dec. 2008.

Diez, David, "Survival Analysis in R", Retrieved at << http://www.statgrad.com/teac/surv/R_survival.pdf >>, p. 1-16, Jul. 4, 2009.

Isard, Michael, "Autopilot: Automatic Data Center Management", Retrieved at << http://citeseerx.ist.psu.edu/viewdoc/download?doi=10.1.1.127.6107&rep=rep1&type=pdf >>, ACM SIGOPS Operating Systems Review, vol. 41, Issue 2, Apr. 2007, pp. 8.

Kaplan, et al., "Nonparametric Estimation from Incomplete Observations", Retrieved at << http://www.biecek.pl/statystykaMedyczna/2281868.pdf >>, Journal of the American Statistical Association, vol. 53, No. 282, Jun. 1958, p. 457-481.

Koh, et al., "An Interior-Point Method for Large-Scale L1-Regularized Logistic Regression", Retrieved at << http://citeseerx.ist.psu.edu/viewdoc/download?doi=10.1.1.88.5451&rep=rep1&type=pdf >>, Proceedings of the 22nd national conference on Artificial intelligence, vol. 1, Jul. 22-26, 2007, pp. 37.

Patterson, et al., "Recovery Oriented Computing (ROC): Motivation, Definition, Techniques, and Case Studies", Retrieved at << http://citeseerx.ist.psu.edu/viewdoc/download?doi=10.1.1.16.6351&rep=rep1&type=pdf >>, Mar. 15, 2002, pp. 16.

\* cited by examiner

REPAIR-POLICY REFINEMENT IN DISTRIBUTED SYSTEMS

BACKGROUND

Large scale distributed systems are becoming increasingly popular for use in applications that require a high level of availability and/or processing capability. Popular uses for distributed systems include search engines and other online applications. Typically, such distributed systems include hundreds to hundreds of thousands of computing devices each executing one or more processes. As with any computing device, each of the computing devices executing within the distributed system may fail. However, because of the large scale of the systems, correcting such failures in a rapid and economically feasible way may be difficult.

One solution to the failure of computing devices is known as repair services. Typically the repair services monitor the computing devices of the distributed system for failures and take one or more repair actions based on any detected failures according to a policy. For example, if the repair service determines that a computing device is not responsive, then the policy may dictate that the computing device be rebooted. While such repair services are effective, it is complex and expensive to (a) measure the effectiveness of a particular policy or repair action in the distributed system and (b) determine and adjust the accuracy of the sensors.

SUMMARY

Computing devices that make up a distributed system are monitored by an automated repair service. The automated repair service uses sensors to monitor the computing devices and performs one or more repair actions on any computing devices that are found to fail according to repair policies. The repair actions include automated repair actions (e.g., reboot, reimage, etc.,) and non-automated repair actions (e.g., call a human technician, etc.). The health of the computing devices is recorded in the form of states along with the repair actions that were performed on the computing devices and the times at which the repair actions were performed. The state information may also include a description of the sensor measurements that have caused the state to be entered. After some period of the time, the history of states of each computing device and the repair actions performed on the computing devices are analyzed using survival analysis to determine the effectiveness of the various repair actions. A statistical analysis is performed based on the determined effectiveness of each repair action and the signals and events generated by the sensors. Based on the analysis, one or more of the policies for the distributed system may be adjusted and one or more of the sensors may be adjusted.

In an implementation, devices are monitored using sensors. A state of each of the devices is determined based on the monitoring. One or more repair actions are performed on one or more of the devices according to the determined states. For each device, the state of the device and any repair actions performed on the device are recorded. The effectiveness of one or more repair actions is determined using the recorded states and the performed repair actions.

Implementations may include some or all of the following features. Determining the effectiveness of one or more repair actions using the recorded states and performed repair actions may include determining the effectiveness of each repair action using statistical survival analysis. The repair actions may include restarting the device, reinstalling a software application associated with the device, and/or reimaging the device. The effectiveness of the policies may be determined using the determined effectiveness of the repair actions. The policies may be adjusted based on the effectiveness of the policies. The effectiveness of the sensors may be determined using the recorded states and the determined effectiveness of the repair actions. One or more of the sensors may be replaced according to the determined effectiveness of the sensors. The devices may each include a computing device, a process, and/or a software application.

In an implementation, a sequence of states for each of a plurality of devices is received. The sequence of states for a device includes an indicator of each state of the device entered into and an indicator of a repair action performed on the device. The effectiveness of the repair actions are determined based on the sequence of states. One or more policies are received. The policies describe repair actions to perform on devices based on the states of the devices. The effectiveness of the one or more policies is determined based on the determined effectiveness of the repair actions. Determining the effectiveness of the repair actions based on the sequence of states may include determining the effectiveness of the repair actions based on the sequence of states using statistical survival analysis.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
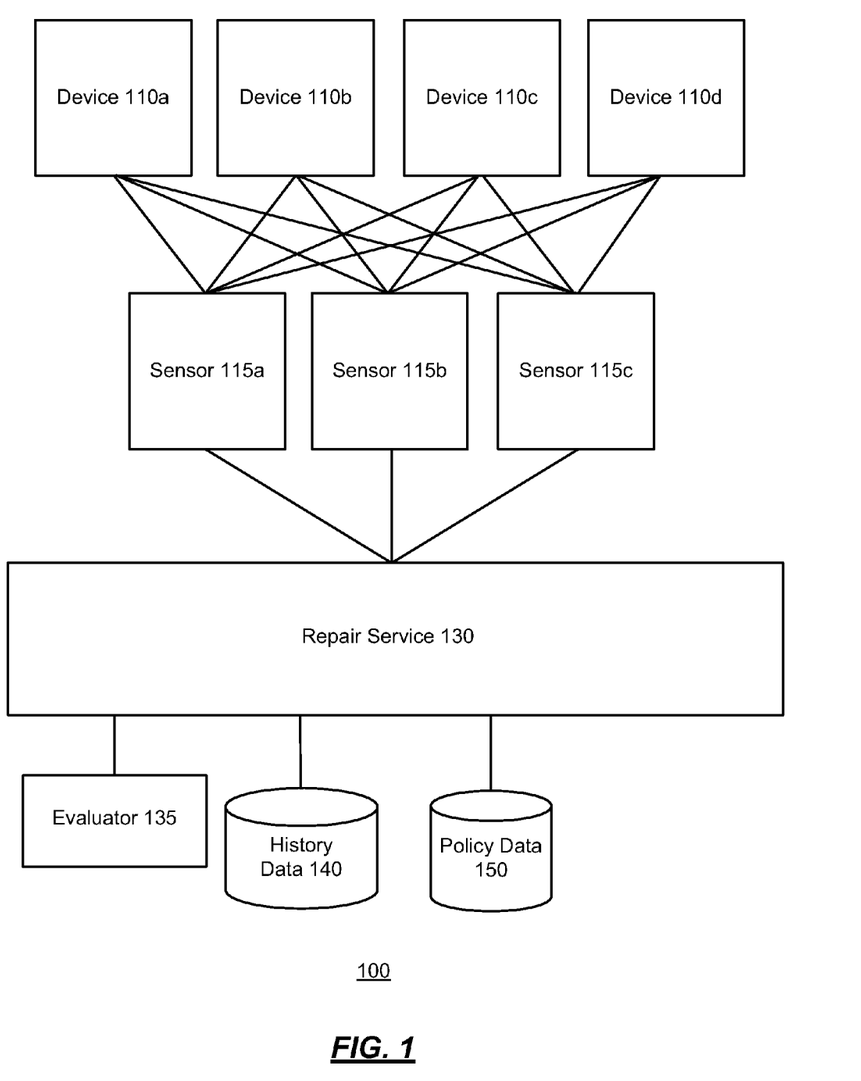
FIG. 1 is an illustration of an example environment for evaluating repair actions in a distributed system.

FIG. 1 is an illustration of an example environment 100 for evaluating repair actions in a distributed system. The environment 100 may include a distributed system comprising a plurality of devices such as the devices 110*a-d* illustrated in FIG. 1. Each device in the distributed system may be an autonomous agent and may communicate with other devices in the distributed system to achieve a common goal. For example, the distributed system may implement a search engine and each of the devices 110*a-d* may respond to different user queries.

Figure 5:
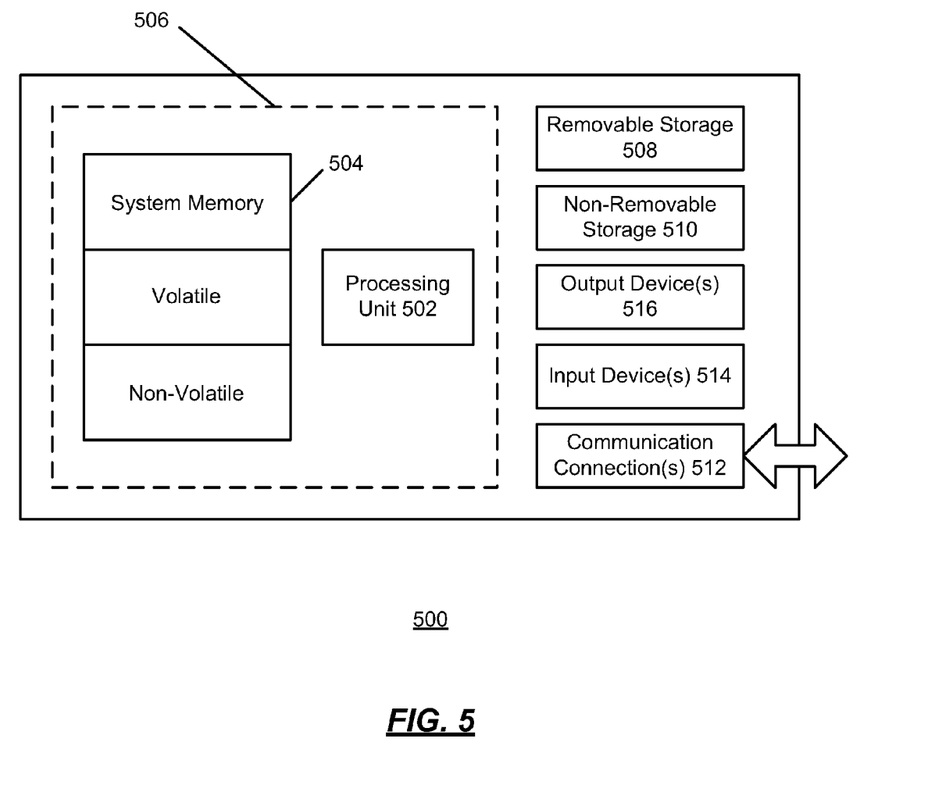
FIG. 5 is a block diagram of a computing system environment according to an implementation of the present system.

In some implementations, each device may be implemented as a separate computing device such as the computing system 500 illustrated in FIG. 5. In other implementations, each device may be network device, a storage device, a communication device, process, or a software application. The devices may communicate with one another using a network or other communication means. While only four devices 110a-d are shown, it is for illustrative purposes only; there is no limit to the number of devices that may be supported by the environment 100. In implementations there may be thousands or hundreds of thousands of devices in the environment 100.

The environment 100 may further include a repair service 130. The repair service 130 may monitor the devices 110a-d, and perform one or more repair actions on the devices. The repair actions may include rebooting a device, reinstalling software on a device, re-imaging the device, and invoking one or more levels of human technicians or other users, for example. Any one of a variety of repair actions may be supported. The repair service 130 may be implemented using a variety of computing devices such as the computing system 500.

The repair actions available to the repair service 130 may include automated and non-automated repair actions. The automated repair actions may include doing nothing, rebooting, non-destructive reimaging, destructive reimaging, and updating software, for example. The non-automated repair actions may include calling for escalating levels of repair persons (e.g., tier 1, tier 2, and tier 3), for example. Other repair actions may be supported.

Each repair action may have an associated cost. For example, each automated repair action may have a cost in that the device may remain unavailable for some period of time while the repair action is performed. Further, each non-automated repair action may have a cost associated with the repair person in addition to the cost of the device being unavailable. The repair actions may be ordered according to cost. The set of ordered repair actions is referred to herein as a repair ladder. In general, when a device requires a repair action, the repair service 130 may apply the repair action from the bottom of the ladder (i.e., the lowest cost repair action), and continue up the ladder applying repair actions until the device has been successfully repaired.

The repair service 130 may monitor the devices 110a-d using one or more sensors (e.g., monitoring agents) such as the sensors 115a-c. The sensors 115a-c may generate events and signals indicating the health of the devices and provide the events and signals to the repair service 130. The repair service 130 may then use the events and signals to determine if any repair actions are to be taken. The sensors may monitor the devices using a variety of well known methods and techniques. The sensors may be hardware sensors, software sensors, or some combination of both. As illustrated, each sensor may monitor one, some, or all of the devices in the environment 100. In other implementations, more or fewer sensors may be used and each sensor may not monitor each device.

The repair service 130 may use the signals and events generated by the sensors to assign a state to each of the devices 110a-d. The state assigned to each of the devices may indicate the health of the device and may be used to determine if any repair actions may be taken on the device. The history of states for a device may be stored as the history data 140. The history data 140 may include a record of each state entered by a device, along with the time the state was entered into, and any repair actions taken on the device by the repair service 130. In addition, the history data 140 may include an identifier of each signal and event that was received from a sensor and/or an identifier of the particular sensor whose signal triggered a state change or repair action. The history data 140 may further include one or more signals and events that were generated by the devices 110a-d themselves.

The repair service 130 may select a repair action to apply to a device using one or more policies. The policies may be stored as the policy data 150. In some implementations, a policy is a function that takes as an input a signal or event from a subset of the sensors, a current state of a device, and some portion of the history data 140 for the device. The history data 140 includes any repair actions previously performed on the device. The policy function may then return a repair action to perform on the device, or alternatively a pointer or a location in the repair action ladder. In some implementations, the policy may further specify the number of times the particular repair action may be applied.

Figure 2:
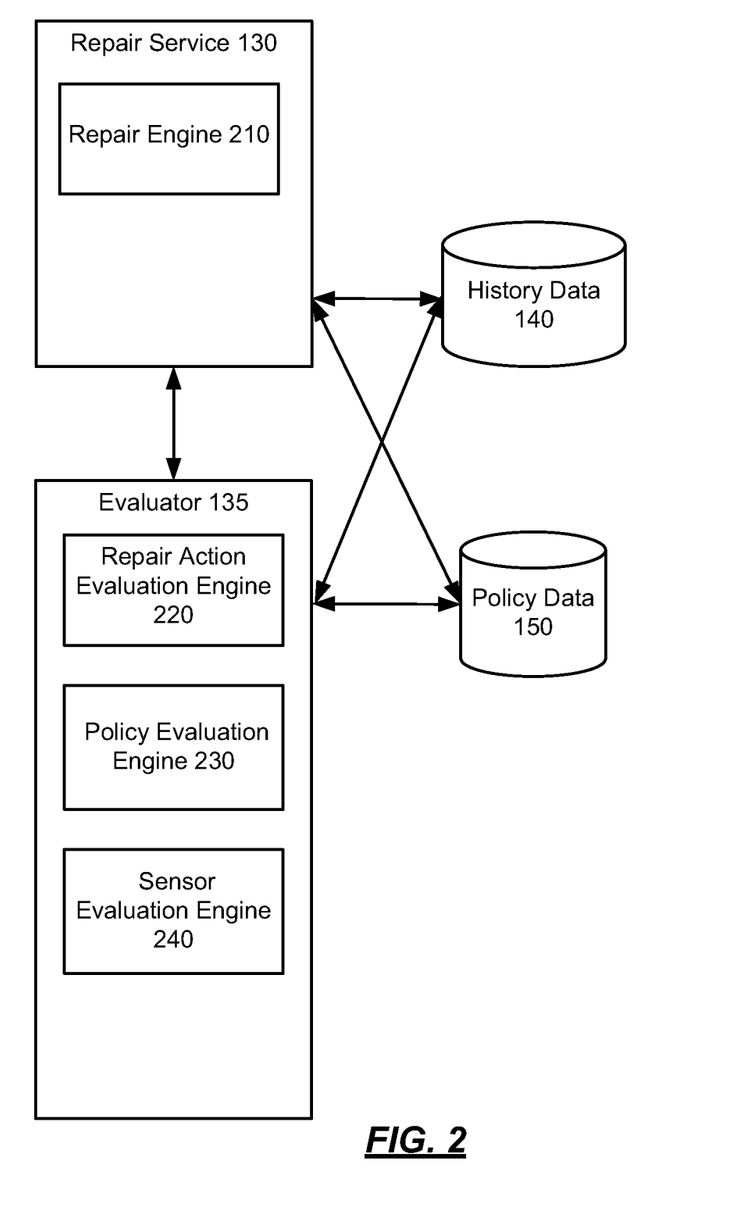
FIG. 2 is an illustration of an example repair service and an example evaluator.

As described further with respect to FIG. 2, the environment 100 may further include an evaluator 135 that may determine the effectiveness of one or more of the repair actions using the history data 140. In general, the effectiveness of a repair action may be measured based on the amount of time that the devices remain in a healthy state after receiving the repair action. Thus, the effectiveness of the repair actions may be determined using survival statistical analysis in an implementation. Further, the evaluator 135 may use the generated effectiveness data to determine the effectiveness of the policies and/or the sensors 115a-c.

FIG. 2 is an illustration of an example repair service, such as the repair service 130, and an example evaluator 135. As shown, the repair service 130 may include one or more components including, but not limited to, a repair engine 210. The evaluator 135 may also include one or more components including, but not limited to, a repair action evaluation engine 220, a policy evaluation engine 230, and a sensor evaluation engine 240. While all the components are illustrated as part of the repair service 130 and the evaluator 135, each of the various components may be implemented separately from one another using one or more computing devices such as the computing system 500 illustrated in FIG. 5, for example.

The repair engine 210 may store and maintain a state for each of the devices. In addition, the repair engine 210 may record the history of states for each of the devices as the history data 140. In some implementations, the history data 140 may include a record for each device along with a state history for each device, a time or date associated with each state, and indicators of any repair actions that were performed on the device. The history data 140 may further identify the signals/events and/or the sensors that resulted in the application of any repair actions to the device. The history data 140 may also further include one or more signals and events that were generated by the devices 110a-d. The states of each device may be determined by the repair engine 210 using one or more signals or events and other data received from the sensors.

The repair engine 210 may further perform one or more repair actions on the devices according to one or more policies. The policies may be stored and retrieved from the policy data 150. In some implementations, a policy may be a function that takes signals or events from one or more sensors, the current state of device, and some or all of the history of a device, and returns a repair action to perform on the device.

The repair action evaluation engine 220 may use the history data 140 to evaluate the effectiveness of one or more of the repair actions. As described above, one way to measure the effectiveness of a repair action is based on the amount of time that devices who receive the repair action remain in a healthy state after receiving the repair action. In particular, the repair actions may be evaluated using statistical survival analysis which is commonly used to evaluate the effectiveness of medical treatments or medications. Other types of statistical analysis may also be used.

In some implementations, the repair action evaluation engine 220 may estimate the probability that a particular device will remain in a healthy state for at least a time to given that a repair action A was performed (i.e., $P(t_\alpha|A)$).

In some implementations, the probability may be determined by the repair action evaluation engine 220 using a Kaplan-Meier estimator according to equation (1) given the history data 140 with N samples and availability times $t_1 \leq t_2 \leq \ldots t_n$:

$$\hat{P}(t_a | A) = \prod_{t_i} \frac{n_i - f_i}{n_i} \quad (1)$$

In equation (1), $n_i$ represents the number of devices that are available (i.e., in a healthy state) just prior to the time $t_i$, and $f_i$ is the number of devices that fail prior to the time $t_i$.

In some implementations, the repair action evaluation engine 220 may, for each repair action, determine the probability that a device remains in a healthy state for at least a threshold amount of time after applying the repair action. The threshold time may be unique to each repair action and may represent the amount of time that a device may remain in a healthy state after a repair action is applied in order for the cost of the repair action to be considered to be successful based on the costs of the repair action. If a device fails after a repair action has been applied after an amount of time that is less than the threshold time for that repair action, then the repair service 130 would have been better off applying the next repair action in the repair action ladder. The threshold time for each repair action may be determined by a user or administrator.

The policy evaluation engine 230 may evaluate the effectiveness of one or more of the policies in the policy data 150 using the determined effectiveness of the repair actions as determined by the repair action evaluation engine 220 and the history data 140. In some implementations, the policy evaluation engine 220, for each repair action, may induce a model of the relationship between the history of a device, the signals or events received from the sensors, and the probability that a device remains in a healthy state past the threshold time for that repair action. In some implementations, the model may comprise a classifier, such a pattern classifier. The model may be trained using statistical machine learning using the history data 140 and the probabilities generated by the repair action evaluation engine 220, for example. Other statistical methods may also be used.

In some implementations, the policy evaluation engine 230 may determine a model for a repair action by using the history data 140 to identify devices that remained in a healthy state longer than the threshold time after the repair action was applied, and devices that did not remain in a healthy state after the repair action was applied. The particular state history of each device in each group, along with the signals and other data received when the repair action was applied to each computing using may then be processed by a pattern classifier to identify one or more signals and state history information that may be used to predict whether a device will fail before the threshold time of the repair action has elapsed.

The policy evaluation engine 230 may use the generated models to evaluate the effectiveness of the one or more policies in the policy data 150. For example, where a policy in the policy data 150 recommends a repair action for a device that the model for that repair action suggests will not result in the device remaining in a healthy state for longer than the threshold time, the policy may be refined to recommend a repair action that is further up the repair action ladder. Alternatively or additionally, the generated models may replace the policies in the policy data 150 and may become the new policies. In some implementations, the policy evaluation engine 230 may continuously use the probabilities generated by the repair action evaluation engine 220 and the history data 140 to evaluate and refine the policies in the policy data 150.

In some implementations, the policy evaluation engine 240 may use a formal language to represent the sequence of the signals and events from the history data 140. The formal language may be a regular expression, and may be used to extract subsegments of interest from the sequence of signals and events from the event history data 140. These extracted subsegments of interest may then be used for the analysis of the effectiveness of the one or more policies. Other formal languages may also be used.

The sensor evaluation engine 240 may evaluate the effectiveness of the sensors 115*a-c* to determine if one or more sensors are faulty, need to be recalibrated, or are outputting incorrect signals. In some implementations, the sensor evaluation engine 240 may evaluate the effectiveness of the sensors based on the effectiveness of the repair actions as determined by the repair action evaluation engine 220. For example, if a sensor sends a signal or data that a device has failed after applying a repair action, and the amount of time that has passed since the repair action is below the expected survival time for the device based on the probabilities generated by the repair action evaluation engine 220, then the sensor may be flagged or otherwise indicated as suspect or faulty. The suspected faulty sensor may be monitored for further suspicious signals by the sensor evaluation engine 240. After a sensor has been determined to be faulty, the sensor may be replaced by a user or administrator, for example. In addition, some or all of the history data 140 attributed to the sensor may be removed because it may not be considered to be reliable.

In some implementations, the sensor evaluation engine 240 may use a formal language to represent the sequence of the signals and events from the history data 140 similarly as described above with respect to the policy evaluation engine 230. These extracted subsegments of interest may then be used for the analysis of the effectiveness of the one or more sensors.

Figure 3:
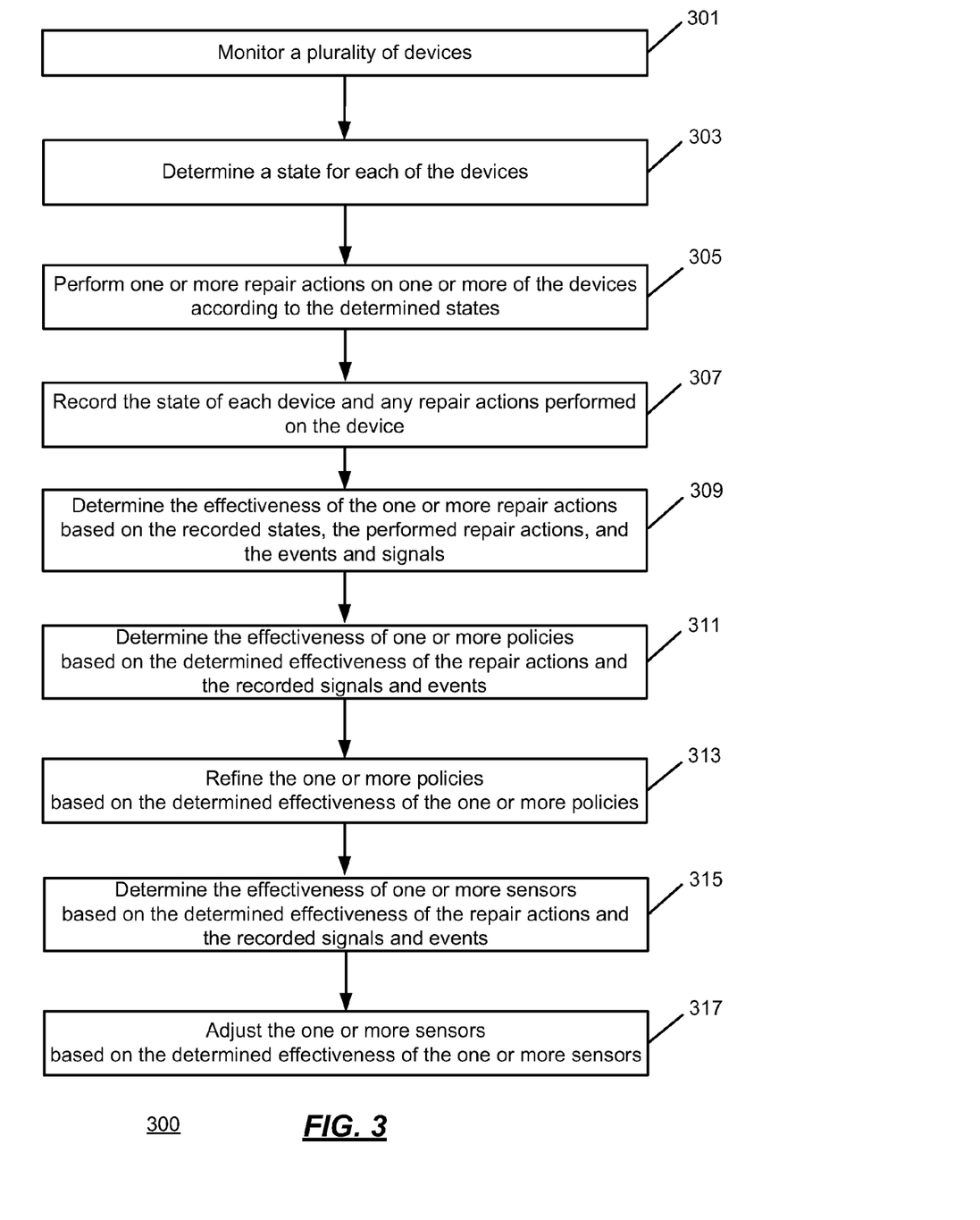
FIG. 3 is an operational flow of an implementation of a method for evaluating the effectiveness of repair actions in a distributed system.

FIG. 3 is an operational flow of an implementation of a method for evaluating the effectiveness of repair actions in a distributed system. The method 300 may be implemented by the repair service 130 and the evaluator 135, for example.

A plurality of devices is monitored at 301, using one or more sensors by the repair service 130. The one or more sensors may monitor the devices to determine if the devices are functioning correctly. The one or more sensors may generate and transmit signals and events indicative of the monitoring to the repair service 130. In some implementations, each device may comprise a computing device. In some implementations, each device may comprise a software application or process, for example.

A state is determined for each of the devices at 303. The states may be determined by the repair engine 210 of the repair service 130 based on the generated plurality of signals and events. In some implementations, a state may indicate the health of the device. Example states may include "healthy" and "failed", indicating that a device is performing correctly or is no longer performing correctly, respectively. Other states may also be supported.

One or more repair actions are performed on the devices according to the determined states at 305. The one or more repair actions may be performed by the repair engine 210 of the repair service 130. In some implementations, the repair actions may be performed according to one or more policies from the policy data 150. A policy may be function that takes a state of a device, the output of one or more sensors, and/or a state history associated with the device, and returns a repair action to perform on the device.

In some implementations, the repair actions may include both automated and non-automated repair actions. The automated repair actions may include repair actions that can be performed on a device without human intervention, such as rebooting the device, and reinstalling software on the device, for example. The non-automated repair actions may include repair actions that include human intervention, such as calling a particular level of repair technician, for example. As may be appreciated, the automated repair actions have a lower cost in terms of device downtime and actual repair costs than the non-automated repair actions.

The state of each device and any repair actions performed on the devices are recorded at 307. The state of each device and the repair actions performed on the device may be recorded by the repair engine 210 of the repair service 130 as the history data 140. In addition, a time the device entered each state may also be recorded in the history data 140, as well as the events and signals generated by the sensors.

The effectiveness of the one or more repair actions are determined based on the recorded states, the performed repair actions, and the time the devices entered each state at 309. The effectiveness of the one or more repair actions may be determined by the repair action evaluation engine 220 of the evaluator 135 from the history data 140. The effectiveness of each repair action may be determined using a variety of statistical analysis techniques includes survival analysis based on the amount of time each device remains in a healthy state after the repair action is applied to it. In some implementations, the repair action evaluation engine 220 may determine one or more probabilities for each repair action that describes the probability that a device will remain in a healthy state after receiving the repair action after predetermined amounts of time.

In particular, the repair action evaluation engine 220 may determine, for each repair action, the probability that a device will remain in a healthy state for an amount of time greater than a threshold time for that repair action. The threshold time for a repair action is the amount of time that a device is to remain in a healthy state after applying the repair action for the repair action to have been worthwhile (e.g., a more costly repair action should not have been applied).

For example, if a device is fixed using the repair action of rebooting, but the device immediately fails again, the repair engine 220 may have been better off applying the next repair action in the repair ladder, such as reinstall, rather than initially applying the rebooting repair action. The threshold amount of time for each repair action may be determined empirically by a user or administrator, for example.

The effectiveness of one or more policies is determined based on the determined effectiveness of the repair actions and the recorded signals and events at 311. The effectiveness of the policies may be determined by the policy evaluation engine 230 of the evaluator 135. In some implementations, the policy evaluation engine 230 may use or more statistical or machine learning techniques, such as a pattern classifier, to generate a model for each repair action that predicts whether a device will remain in a healthy state after a repair action is applied based on the history of the device, the effectiveness of the repair action, and the events and signals received from the sensors.

In some implementations, a formal language may be used to represent the sequence of the signals and events from the history data 140. The formal language may be a regular expression, and may be used to extract subsegments of interest from the sequence of signals and events from the event history data 140. These extracted subsegments of interest may then be used for the determination of the effectiveness of the one or more policies by the policy evaluation engine 230.

The one or more policies are refined based on the determined effectiveness at 313. The policies may be refined by the policy evaluation engine 220 of the evaluator 135. The policies may be refined by determining which policies recommend applying repair actions for devices that are contrary to the generated model for that repair action. For example, if a policy recommends that a device is rebooted when the model for that repair action suggests that the device will not remain healthy past the threshold time for a reboot repair action, the policy may be adjusted to recommend the next repair action in the repair ladder for similar devices.

The effectiveness of one or more sensors is determined based on the effectiveness of the repair actions and the recorded signals and events at 315. The effectiveness of the one or more sensors may be determined by the sensor evaluation engine 240 of the evaluator 135. Determining the effectiveness of the sensors may include determining if one or more sensors are faulty, need to be recalibrated, or are outputting incorrect signals. As described above, one or more probabilities may be determined at 309 for each repair action that indicate the survival probability of a device after receiving the repair action at one or more times. In order to evaluate the performance of the sensors, the sensor evaluation engine 240 may determine if one or more devices exhibit state behaviors after a repair action that are outside the expected state behaviors based on the one or more probabilities associated with that repair action. For example, if 90% of the devices that receive a reboot repair action survive for ten days, and one of the rebooted devices survives for only one day, there may be an issue with one or more of the sensors that monitor the device. In particular, the sensor may be sending signals leading the repair engine 130 to incorrectly determine the state of the device. Sensors associated with devices that have a state behavior that is inconsistent with the generated probabilities for the repair actions may be flagged or otherwise indicated for further examination or monitoring by a user or administration, for example.

In some implementations, the sensor evaluation engine 240 may determine the effectiveness of the sensors using a formal language to represent the sequence of the signals and events from the history data 140. The formal language may be a regular expression. These extracted subsegments of interest may then be used for the analysis of the effectiveness of the one or more sensors.

The sensors are adjusted based on the determined effectiveness at 317. The sensors may be adjusted by the sensor evaluation engine 240 of the evaluator 135. In some implementations, the sensors that have been determined to be ineffective may be adjusted by rebooting the sensor. Adjusting the sensors may include recalibrating the sensors. Alternatively, or additionally, an administrator may be called to repair the sensor or to replace the ineffective sensor with a new sensor.

Figure 4:
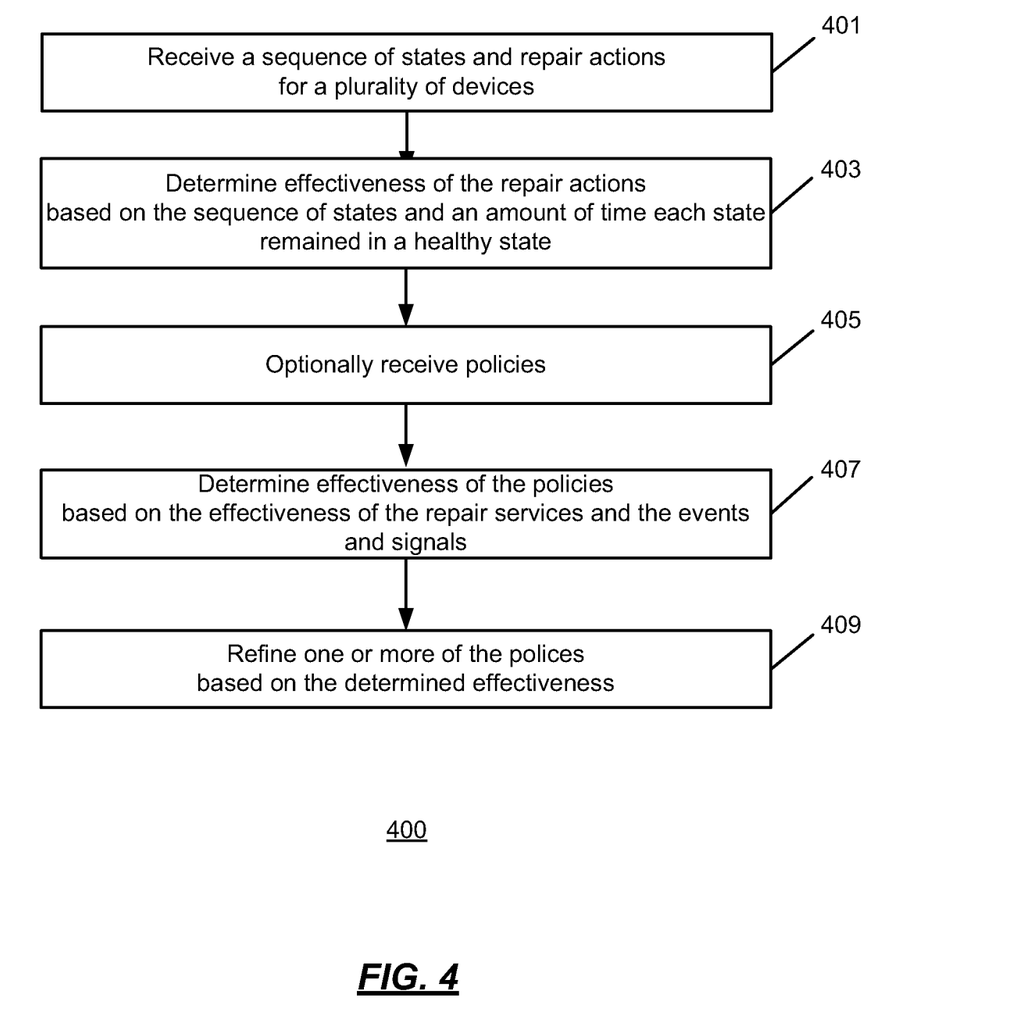
FIG. 4 is an operational flow of another implementation of a method for evaluating the effectiveness of repair actions in a distributed system.

FIG. 4 is an operational flow of another implementation of a method for evaluating the effectiveness of repair actions in a distributed system. The method 400 may be implemented by the evaluator 135, for example.

A sequence of states and repair actions for a plurality of devices are received at 401. The sequence of states and repair actions may be received by the repair action evaluation engine 220 of the evaluator 135. The sequence of states and repair actions may be comprised within the history data 140 and may include, for each device, a history of the states that the device transitioned into and an associated time, along with any repair actions that brought about the transitions. In addition, one or more of the signals or events that were received from sensors or the devices regarding each device may also be part of the history data 140.

The effectiveness of the repair actions are determined based on the sequence of states and an amount of time that each state that had a repair action performed on it remained in a healthy state at 403. The effectiveness of the repair actions may be determined from the sequence of states by the repair action evaluation engine 220. In some implementations, the effectiveness of each repair action may be presented as a probability that a device will remain in a healthy state after the threshold time for that repair action.

One or more policies are optionally received at 405. The one or more policies may be received by the policy evaluation engine 230 of the evaluator 135. In some implementations, the policy evaluation engine 230 may evaluate the policies without receiving or knowing what the one or more policies are. Thus, in those implementations it may not be necessary to receive the one or more policies.

The effectiveness of the policies is determined based on the determined effectiveness of the repair services and the events and signals from the sensors at 407. The effectiveness of the policies may be determined by the policy evaluation engine 230 of the evaluator 135 using a formal language to represent a sequence of the signals and events. The formal language may be used to extract subsegments of interest from the sequence of signals and events from the event history data 140. These extracted subsegments of interest may then be used for the determination of the effectiveness of the policies.

In some implementations, the effectiveness of the policies may be determined using one or more statistical or machine learning techniques including a pattern classifier for each repair action. The pattern classifier may be trained using the determined effectiveness of the repair services, and the sequence of signals and events. The pattern classifier may be trained to recommend a repair action based on one or more signals and events from the sensors, a current state of a device, and the state history of the device. The effectiveness of the one or more policies may be determined by comparing the recommended repair action of a policy and the recommended repair action of a classifier.

The policies are refined based on the determined effectiveness at 409. The policies may be adjusted by the policy evaluation engine 230 of the evaluator 135. The policies may be refined such that their output more closely resembles the desired output of the classifiers. In some implementations, the classifiers may replace the policies in the policy data 130.

FIG. 5 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well-known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing system 500. In its most basic configuration, computing system 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing system 500 may have additional features/functionality. For example, computing system 500 may include additional storage (removable and/or non-removable) including, but not limited to, magnetic or optical disks or tape. Such additional storage is illustrated in FIG. 5 by removable storage 508 and non-removable storage 510.

Computing system 500 typically includes a variety of computer readable media. Computer readable media can be any available media that can be accessed by computing system 500 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system 500. Any such computer storage media may be part of computing system 500.

Computing system 500 may contain communications connection(s) 512 that allow the device to communicate with other devices. Computing system 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
   monitoring a plurality of devices using a plurality of sensors, wherein the plurality of sensors generate a plurality of signals and events for each device based on the monitoring;
   determining a state of each of the plurality of devices based on the generated plurality of signals and events by a repair service;
   performing one or more repair actions on one or more of the plurality of devices according to the determined states by the repair service;
   recording, for each device, the state of the device, a time the device entered the state, any repair actions performed on the device by the repair service, and the generated plurality of signals and events for the device;
   determining an effectiveness of the one or more repair actions using the recorded states, the performed repair actions, and the time the devices entered each state; and
   determining the effectiveness of the one or more sensors using the determined effectiveness of the one or more repair actions and the generated plurality of signals and events of the one or more sensors using a formal language to represent a sequence of the signals and events.

2. The method of claim 1, wherein determining the effectiveness of the one or more repair actions comprises determining the effectiveness of each repair action based on an amount of time a device that the repair action is performed on remains in a healthy state.

3. The method of claim 2, wherein determining the effectiveness of each repair action uses statistical survival analysis.

4. The method of claim 1, wherein the formal language comprises a regular expression and further comprising extracting subsegments of interest from the sequence of signals and events for the analysis of the effectiveness of the one or more sensors.

5. The method of claim 1, further comprising adjusting one or more of the sensors according to the determined effectiveness of the one or more sensors.

6. The method of claim 1, further comprising determining the effectiveness of one or more policies using the determined effectiveness of the one or more repair actions and the generated plurality of signals and events using the formal language to represent a sequence of the signals and events.

7. The method of claim 6, wherein determining the effectiveness of the one or more policies comprises determining the effectiveness of the one or more policies using one of machine learning and statistical techniques, wherein the statistical techniques comprise a pattern classifier.

8. The method of claim 1, wherein the devices each comprise at least one of a computing unit, a storage unit, a communication unit, a process, or a software application.

9. The method of claim 1, wherein the state comprises a healthy state or a failed state, and the repair actions include at least one of restarting the device, reinstalling a software application associated with the device, or reimaging the device.

10. A method comprising:
    receiving a sequence of states for each of a plurality of devices by a repair service, wherein the sequence of states for a device comprises an indicator of each state the device entered into and an associated time, an indicator of each repair action performed on the device, and the events and signals generated by one or more sensors or devices that led to the repair action;
    determining the effectiveness of the repair actions based on the sequence of states and an amount of time each state that had a repair action performed remained in a healthy state by the repair service;
    receiving one or more policies by the repair service, wherein the policies indicate repair actions to perform on the devices based on the states of the devices and the events and signals generated by the one or more sensors; and
    determining the effectiveness of the one or more policies by the repair service based on the determined effectiveness of the repair actions and the events and signals generated by one or more sensors that led to the repair actions from the sequence of states using a formal language to represent a sequence of the signals and events.

11. The method of claim 10, wherein determining the effectiveness of the repair actions comprises determining the effectiveness of the repair actions using statistical survival analysis.

12. The method of claim 10, further comprising refining the one or more policies based on the effectiveness of the one or more policies.

13. The method of claim 10, wherein the devices each comprise at least one of a computing unit, a communications unit, a network unit, a process, or a software application.

14. A system comprising:
    a plurality of devices;
    a plurality of sensors monitoring the plurality of devices and generating a plurality of signals and events for each device based on the monitoring; and
    a repair service adapted to:
       determine a state of each of the devices based on the plurality of signals and events;
       perform one or more repair actions on one or more of the devices according to the determined states;
       record, for each device, the state of the device, a time the device entered the state, any repair actions performed on the device by the repair service, and the generated plurality of signals and events for the device;
       determine the effectiveness of one or more repair actions using the recorded states, the performed repair actions, and the time the devices entered each state; and
       determine the effectiveness of the one or more sensors using the determined effectiveness of the one or more repair actions and the generated plurality of signals and events of the plurality of sensors using a formal language to represent a sequence of the plurality of signals and events.

15. The system of claim 14, wherein the repair service is adapted to determine the effectiveness of each repair action based on an amount of time a device that the repair action is performed on remains in a healthy state.

16. The system of claim 14, wherein the repair service is further adapted to adjust one or more of the plurality of sensors according to the determined effectiveness of the plurality of sensors.

17. The system of claim 14, wherein the devices each comprise at least one of a computing unit, a storage unit, a communication unit, a process, or a software application.

18. The system of claim 14, wherein the state comprises a healthy state or a failed state, and the repair actions include at least one of restarting the device, reinstalling a software application associated with the device, or reimaging the device.

19. The system of claim 14, wherein determining the effectiveness of each repair action uses statistical survival analysis.

20. The system of claim 14, wherein the repair service is further adapted to determine the effectiveness of one or more policies using the determined effectiveness of the one or more repair actions and the generated plurality of signals and events using the formal language to represent a sequence of the signals and events.

\* \* \* \* \*